United States Patent [19]

Schweid et al.

[11] Patent Number: 4,539,215

[45] Date of Patent: Sep. 3, 1985

[54] EMULSIFICATION SYSTEM FOR CREAMY FOOD PRODUCTS

[75] Inventors: Jeffrey M. Schweid, Dover, Del.; Arthur H. Cohee, Ridgely, Md.; Anthony F. Dec, Dover, Del.

[73] Assignee: General Foods Corporation, White Plains, N.Y.

[21] Appl. No.: 511,617

[22] Filed: Jul. 7, 1983

[51] Int. Cl.³ .......................... A23L 1/24; A23L 1/04; A23L 1/187
[52] U.S. Cl. ..................................... 426/589; 426/613; 426/654; 426/662; 426/650; 426/573; 426/579
[58] Field of Search ............... 426/589, 573, 654, 662, 426/96, 98, 99, 650, 613, 579

[56] References Cited

U.S. PATENT DOCUMENTS

| | | | |
|---|---|---|---|
| 3,676,157 | 7/1972 | Wintersdorff | 426/654 |
| 4,269,974 | 5/1981 | Wintersdorff | 426/589 |
| 4,423,084 | 12/1983 | Trainor et al. | 426/589 |

*Primary Examiner*—Jeanette Hunter
*Attorney, Agent, or Firm*—Sam D. Walker; Thomas R. Savoie; Daniel J. Donovan

[57] ABSTRACT

A dry mix which contains an emulsification system including a combination of Polysorbate 60, xanthan gum and lecithin can be used to produce a creamy and stable fluid emulsion by hand shaking the dry mix with an aqueous phase and an oil phase. The amount of shaking required to produce a stable oil-in-water emulsion is much reduced as compared to other emulsification systems. The emulsification system of this invention has broad applicability for producing comestibles having a creamy texture and mouthfeel.

7 Claims, No Drawings

EMULSIFICATION SYSTEM FOR CREAMY FOOD PRODUCTS

TECHNICAL FIELD

Dry salad dressing mixes to be used in the home preparation of fluid salad dressings have received wide acceptance in the marketplace. These mixes are an economical alternative to prepared, bottled salad dressings which are both expensive to package and distribute and bulky to transport and store. Dry salad dressing mixes have the ability to be used in the preparation of fresh dressings which are prepared at the point of consumption at such time and in such quantity as may be desired. The dry dressing mix will be combined with an aqueous phase, such as vinegar and water or buttermilk and an oil phase, such as a vegetable oil or mayonnaise, to form a liquid or fluid dressing. These ingredients will typically be mixed in a jar or cruet by manual shaking of the container in order to form an emulsion. Dressings prepared from dry mixes may contain dry flavor systems which impart a higher flavor impact to the freshly-prepared dressing than found in most bottled dressings.

Non-creamy (i.e., non-opaque) salad dressings, such as Italian dressing, may be prepared by combining a dry salad dressing mix, typically containing dried spices and vegetables and thickener (e.g. vegetable gums) with vinegar, water and salad oil. These relatively non-viscous salad dressings are not expected by the consumer to be stable emulsions. These dressings, even when marketed as bottled dressing, contain little or no emulsifier, readily separate into oil and aqueous phases in the bottle and are intended to be shaken by the consumer immediately prior to each use. Dry mixes for Italian-type dressings which typically contain dried spices and vegetables and a thickener, such as a vegetable gum or comparable hydrocolloid, and which are typically prepared by shaking wth vinegar, water and oil, likewise do not contain an emulsifier and separate soon after shaking.

Opaque or creamy salad dressings, such as most cheese-containing dressings and those dressings designated as creamy-French, creamy-Italian and the like, are, however, expected to be relatively-uniform in consistency and not quickly separate into distinct phases. Opaque or creamy salad dressings which are marketed as bottled dressings will typically contain both emulsifiers and stabilizers and will be processed with the aid of mechanical homoginizers. The ability to employ a homogenization step enables a stable emulsion to be produced using a wide variety of emulsifiers and stabilizers. If stable creamy salad dressings are desired from dry salad dressing mixes, it is necessary to employ an emulsification-stabilization system which is effective with only hand shaking of the dry mix ingredients with the aqueous and oil ingredients. To date, the art is not aware of such a system.

U.S. Pat. No. 4,278,692 to Cassanelli et al. discloses the use of various gums, particularly xanthan gum, in both an encapsulated and unencapsulated state in dry salad dressing mixes. The use of these gums either alone or in combination with an emulsifier is disclosed as enabling the formation of stable, viscous, salad dressing products. However, the process for preparing the dressing from the dry mix, as set forth in the patent, include vigorously shaking the dry mix with vinegar and water for a period of 30 seconds and then adding vegetable oil and again vigorously shaking for a period of 30 seconds. It would be highly desirable to produce a dry salad mix that can be used to form a stable, viscous and creamy emulsion with added aqueous and oil phases using a minimum amount of shaking or shear.

DISCLOSURE OF THE INVENTION

Although the emulsification system which constitutes the subject matter of this invention is described in terms of its use in dry salad dressing mixes, the invention has applicability to any comestible which contains and oil-water emulsion and is especially suitable in food mix which is to be combined with an aqueous and an oil or fat phase in order to produce a creamy fluid emulsion, or to any oil or fat containing comestible which desirably possesses a creamy texture and/or mouthfeel. The emulsification system of this invention may be used either to reduce the amount of work necessary to produce the desired degree of emulsification in any given food product or to increase the emulsion stability in a given food product while using a constant amount of work. Such products as dry, instant topping mixes and dry, instant pudding mixes could readily make use of this invention.

An emulsification system of Polysorbate 60 (polyoxyethylene 20 sorbitan tristearate), lecithin and xanthan gum has been found to be particularly effective for producing a stable, creamy and viscous oil-in-water emulsion with a minimum of shear. This emulsification system is so effective that a stable, oil-water emulsion can be produced in a cruet-type container using only several seconds of hand shaking. The emulsification system is highly suitable for being combined with dry spices, dry vegetables, flavor and color ingredients for the production of a dry salad dressing mix.

The emulsification system of this invention contains on a dry weight ratio basis of polysorbate 60:xanthan gum:lecithin of 0.3–6:0.3–4:1, a more preferred weight ratio is from 0.7–4:0.7–4:1. Preferably the emulsification system consists essentially of these three ingredients.

The Polysorbate 60 compound is a hydrophilic emulsifier well-known in the food art and available from several different suppliers. Xanthan gum is a polysaccharide gum produced by the organism *Xathomonas campestria* and is available in food-grade form from Kelco Co., a subsidiary of Merck & Co. of Rahway, N.J., as well as several other gum suppliers. Lecithin, which is used herein is meant to include hydroxylated lecithin as well, is a natural emulsifier which is readily available on a commercial basis.

The emulsification system of this invention can be combined with the other dry mix ingredients in many ways. The xanthan gum and lecithin, being available as dry ingredients, may simply be mixed with the other dry ingredients. The Polysorbate 60, being a semi-solid at room temperature, may be heated and then plated onto the surface of one or more of the dry ingredients. Alternatively, a liquid lecithin may be combined with heated Polysorbate 60 and then this liquid mixture can be combined with one or more of the dry mix ingredients.

The dry mix, in addition to the emulsification system of this invention, may also include various solids which are present to achieve the desired taste, color, etc. These solids, in the case of dry salad dressing mixes, may include salt, sugar, dextrose, corn syrup, invert sugar syrup, honey, mustard, dried egg, milk solids, paprika, pepper, garlic, onion and other spices, seasoning or flavors, turmeric, caramel and other colors, monosodium glutamate, tomato solids, edible acids, buffers, etc. The dry mix may also contain minor amounts of ingredients such as flow agents (e.g. tricalcium phosphate, sodium silico aluminate, silicon dioxide), preservatives (e.g. butylated hydroxy anisole, tertiary butylhydroquinone, sodium benzoate, sorbic acid, ethylenediaminetetraacetic acid), etc. While minor amounts of other ingredients such as starch or additional emulsifiers or gums may be added to the dry mix they are not necessary to obtain a stable viscous emulsion which can be prepared with a minimum of shear or agitation.

The dry mix of this invention is prepared into a stable dressing by being mixed in a suitable container with an aqueous phase and an oil phase. This mixing can be accomplished in either one or two steps by relatively mild hand shaking of the ingredients in a suitable container. The dry mix may be mixed first with the aqueous phase and then this aqueous mixture combined with the oil phase. Alternatively, the dry mix, and aqueous and oil phases may be mixed in one step.

By stable what is meant is that the oil and aqueous phases do not separate for at least 24 hours after mixing, and by viscous what is meant is that the viscosity is at least about 1000 centipoises within 15 minutes after mixing. The aqueous phase preferably comprises water and/or vinegar (preferably about a 2 to 1 ratio of vinegar to water), while the oil phase can be any edible oil suitable for the desired end product. The suitable oils include vegetable oils such as peanut oil, soybean oil, corn oil, olive oil, palm oil, coconut oil, sunflower oil, safflower oil, cottonseed oil, spices, dried vegetables, flavor and color agents, etc. and mixtures thereof. While the ratio of aqueous phase to oil phase can vary dependent upon the desired end product, preferably it is within the range of about 3 to 5 and 5 to 3 parts by volume.

EXAMPLE 1

A dry salad dressing mix using the ingredient recited below was produced by blending all of the dry ingredients and then spraying heated Polysorbate 60 onto the dry blend.

| Ingredient | Weight % |
| --- | --- |
| Sugar | 26.26 |
| Sodium Citrate | 21.75 |
| Salt | 17.35 |
| Spices, Herbs, Vegetables | 12.62 |
| Artificial Color | 7.99 |
| Xanthan Gum | 2.86 |
| Propylene Glycol Alginate | 2.28 |
| Polysorbate 60 | 2.28 |
| Lecithin | 1.71 |
| Monosodium Glutamate | 1.48 |
| Silicon Dioxide | 0.86 |
| Flavor | 0.11 |
|  | 100.00 |

About 17.5 grams of the above mix is combined in a cruet with 90 ml of 33 grain vinegar and 135 ml of oil and shaken by hand for 10 to 15 seconds. A creamy emulsion for use as a creamy Italian salad dressing was formed. This emulsion remained stable for at least 24 hours at room temperature.

EXAMPLE 2

Several other combinations of gums and/or emulsifiers were evaluated (each combination was evaluated at varying levels in an attempt to optimize performance) in salad dressing mixes comparable to that of Example 1, using the dressing preparation techniques of Example 1; however, none of these combinations produced acceptable emulsification. A summary of these evaluations is as follows:

| System | Emulsion Stability |
| --- | --- |
| Xanthan/locust bean/guar gums | Emulsions did not hold at all. |
| Xanthan gum/lecithin/pectin | Emulsions did not hold at all. |
| Xanthan gum/methylcellulose | Emulsions did not hold at all after only one shake, but held for 15 minutes after a one hour delayed second shake. |
| Xanthan gum/monoglycerides | Emulsion held for only about one minute. |
| Xanthan gum/lecithin/carrageenan | Emulsions held for only about one minute. |
| Xanthan gum/lecithin | Emulsions held for from one to three minutes. |
| Xanthan gum/lecithin/propylene/glycol alginate | Emulsions held for from one to eight minutes. |
| Xanthan gum/lecithin/guar gum | Emulsions held for from two to five minutes. |
| Xanthan gum/lecithin/monoglycerides | Emulsions held for from two to seven minutes. |

EXAMPLE 3

A package of commercial chocolate-flavored instant pudding and pie filling mix (JELL-O ® Brand) was combined with the emulsification system of this invention as follows: 0.4 grams of polysorbate 60 was plated onto a 15 grams fraction of the dry pudding mix; this plated fraction was then combined with the remaining part of the mix (101.9 grams), 0.3 grams of dry lecithin and 0.2 grams of xanthan gum. The foregoing mix was blended with two cups (474 mls) of cold milk using an electric mixer at low speed until the ingredients were well blended (about 2 minutes). The resulting pudding was judged to be smoother and creamier than a control pudding which was made by combining the commercial mix with milk in an identical manner. Both puddings were stored (covered with a plastic wrap) in a refrigerator for one week and the pudding product of this invention retained its creamy, smooth texture and was free of syneresis. The control product exhibited synersis after the one week storage period.

Having thus described the invention, what is claimed is:

1. An emulsification system for food products which requires a mild hand shaking to form an emulsion having a creamy texture said system being consisting essentially of polysorbate 60, xanthan gum and lecithin solids at a weight ratio of 0.3–6:0.3–4:1.

2. The emulsification system of claim 1 wherein the weight ratio is 0.7–4:0.7–4:1.

3. The emulsification system of claim 1 which consists of polyporbate 60, xanthan gum and lecithin.

4. The emulsification system of claim 2 which consists of polyporbate 60, xanhan gum and lecithin.

5. A dry mix for combining with an aqueous and an oil phase in order to make a creamy, viscous, fluid product and to form an emulsion by mild hand shaking, said dry mix containing an emulsification system consisting essentially of polysorbate 60, xanthan gum and lecithin solids at a weight ratio of 0.3–6:0.3–4:1.

6. The dry mix of claim 5 wherein the weight ratio of the emulsification system is 0.7–4:0.7–4:1.

7. The dry mix of claim 5 wherein the mix contains spices, dried vegetables, flavorings and color agent and is a dry salad dressing mix.

* * * * *